US009354721B2

(12) United States Patent
Manzari et al.

(10) Patent No.: US 9,354,721 B2
(45) Date of Patent: May 31, 2016

(54) MOVEMENT BASED IMAGE TRANSFORMATION

(71) Applicant: Apple Inc., Cupertino, CA (US)

(72) Inventors: Behkish J. Manzari, San Francisco, CA (US); Rachel A. Roth, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 318 days.

(21) Appl. No.: 13/630,366

(22) Filed: Sep. 28, 2012

(65) Prior Publication Data

US 2014/0092002 A1  Apr. 3, 2014

(51) Int. Cl.
| | |
|---|---|
| G11B 27/036 | (2006.01) |
| G06F 3/0346 | (2013.01) |
| G06F 3/0484 | (2013.01) |
| G06F 1/16 | (2006.01) |
| G06F 3/042 | (2006.01) |
| G06F 3/0481 | (2013.01) |

(52) U.S. Cl.
CPC .......... *G06F 3/0346* (2013.01); *G06F 3/04845* (2013.01); *G06F 1/1694* (2013.01); *G06F 3/0425* (2013.01); *G06F 3/04815* (2013.01)

(58) Field of Classification Search
CPC .............. G06F 3/0346; G06F 3/03541; G06F 3/04845; G06F 2203/04808; G06F 2200/1637; G06F 3/0425; G06F 1/1694; G06F 3/04815
USPC .................................. 345/156; 715/255, 863
See application file for complete search history.

(56) References Cited

U.S. PATENT DOCUMENTS

| | | | | |
|---|---|---|---|---|
| 8,189,057 | B2 * | 5/2012 | Pertsel et al. ............ | 348/208.16 |
| 2006/0132675 | A1 * | 6/2006 | Choi ............................ | 349/76 |
| 2006/0170816 | A1 * | 8/2006 | Silverstein et al. ........... | 348/362 |
| 2008/0009348 | A1 * | 1/2008 | Zalewski et al. ............... | 463/40 |
| 2008/0080789 | A1 * | 4/2008 | Marks et al. .................. | 382/296 |
| 2008/0214233 | A1 * | 9/2008 | Wilson et al. .............. | 455/556.1 |
| 2008/0244752 | A1 * | 10/2008 | Gudan et al. .................... | 726/27 |
| 2009/0183193 | A1 * | 7/2009 | Miller, IV ....................... | 725/10 |
| 2009/0184849 | A1 * | 7/2009 | Nasiri et al. .................... | 341/20 |
| 2009/0256921 | A1 * | 10/2009 | Pertsel et al. ............ | 348/208.16 |
| 2009/0265627 | A1 * | 10/2009 | Kim et al. ....................... | 715/702 |
| 2009/0271691 | A1 * | 10/2009 | Brush et al. .................... | 715/201 |
| 2009/0319181 | A1 * | 12/2009 | Khosravy et al. ............. | 701/208 |
| 2010/0070926 | A1 * | 3/2010 | Abanami et al. .............. | 715/835 |
| 2010/0079369 | A1 * | 4/2010 | Hartmann et al. ............ | 345/156 |
| 2011/0163944 | A1 * | 7/2011 | Bilbrey et al. ................ | 345/156 |
| 2011/0298937 | A1 * | 12/2011 | Ogawa et al. .............. | 348/208.4 |
| 2012/0069052 | A1 * | 3/2012 | Lee et al. ........................ | 345/633 |
| 2012/0135805 | A1 * | 5/2012 | Miller, IV ........................ | 463/36 |
| 2012/0188243 | A1 * | 7/2012 | Fujii et al. ...................... | 345/426 |
| 2012/0240037 | A1 * | 9/2012 | Migos et al. ................... | 715/255 |
| 2013/0234926 | A1 * | 9/2013 | Rauber .......................... | 345/156 |

* cited by examiner

*Primary Examiner* — Michael J Eurice
(74) *Attorney, Agent, or Firm* — Fish & Richardson P.C.

(57) ABSTRACT

In some implementations, an image can be presented in an image editing interface and the image can be edited based on movement of the mobile device. In some implementations, the mobile device can be configured to provide a plurality of types edits (e.g., filters, effects, etc.) that can be applied to the image, a selection of one or more edit types can be received, movement sensor data can obtained describing movement of the mobile device, and the selected edits can be applied to the image based on the sensor data.

21 Claims, 7 Drawing Sheets

MOVEMENT BASED IMAGE TRANSFORMATION

TECHNICAL FIELD

The disclosure generally relates to image editing on a mobile device.

BACKGROUND

Mobile devices can include applications which a user can use to edit an image. These image editing applications can allow the user to choose a filter, an effect, or a type of edit to apply to the image and save the altered image. The image editing applications may allow the user to control how strongly (e.g., to what degree) the filter, effect, or edit is applied using graphical controls. For example, some image editing applications can allow for control over how strongly the filter, effect, or edit is applied, however the control will require a physical touching of the screen or a key press on the mobile device. For example, this can require the user to manipulate the control (e.g., slide a graphical element left or right) using a touchscreen or a physical keyboard.

SUMMARY

In some implementations, image editing can be performed on a mobile device using a motion sensor. In some implementations, an image can be presented in an image editing interface and the image can be edited based on movement of the mobile device. In some implementations, the mobile device can be configured to provide a plurality of types of edits (e.g., filters, effects, etc.) that can be applied to the image, a selection of one or more edit types can be received, movement sensor data can obtained measuring movement of the mobile device, and the selected edits can be applied to the image based on amount of movement measured.

Particular implementations provide at least the following advantages: Images can be edited without requiring manipulation of graphical controls. The user's image editing experience is made more entertaining and more fun by adjusting an image based on the movement or motion of the mobile device.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

This disclosure describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

Figure 1:
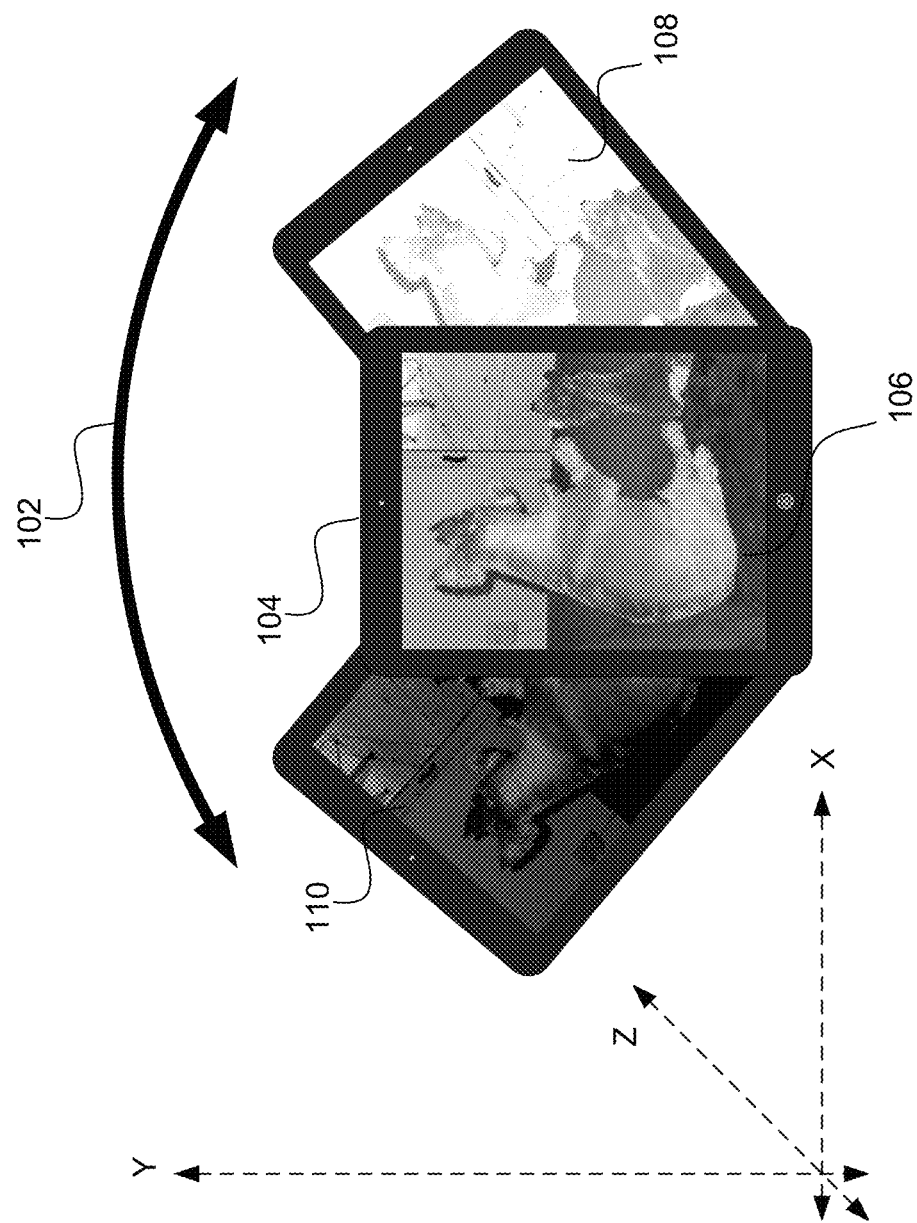
FIG. 1 illustrates an example of editing an image based on movement of a mobile device.

FIG. 1 illustrates an example of editing an image based on movement of a mobile device. In some implementations, mobile device 104 can present an image 106 on a display of mobile device 104. For example, a user can select an image to edit and mobile device 104 can display the selected image. The image can be downloaded from the internet or downloaded over a cellular network. The image can be downloaded from a website or received over file sharing software, and can further include a picture taken by a user using a camera feature of mobile device 104.

In some implementations the image 106 can be selected by a user using an application of the mobile device. For example, if the user has more than one image on the mobile device, the user can use an application on the device to browse through images. Upon selection of a particular image, the image can be presented to the user for editing. In some implementations, the image will automatically be presented to the user for editing based on prior user actions and/or software actions. For example, if a user downloads an image from a website or receives an image from file sharing software, the image may automatically present itself to the user to be edited. The image can also automatically be presented for editing after the user takes a picture using a camera on the mobile device.

In some implementations, the user can choose a type of edit or adjustment to be applied to the image 106. For example, the edit type can include an image filter to be applied to the image. For example, the edit type can be a filter that converts a color image into a black and white (e.g., gray scale) image. The edit type can be an adjustment of saturation or other attributes of the image, such as image hue, chroma, or lightness. In some implementations, a filter can include any linear or nonlinear transformation to be applied to an image. For example, a filter can be applied to an image to remove certain attributes above or below a certain frequency in an image. Filters used in computer-vision systems can be applied, such as a filter to identify edges in an image, convert certain colors into other colors, or make a part of an image visually identifiable to a user.

In some implementations, the edit type to be applied to the image can include an image effect. For example, an effect that makes an image look like it is decades old can be applied.

Furthermore, an effect can be applied to make the image behave as if it were composed of a fluid and slosh around or distort based on the movement of the device. For example, an effect can include any transformation of the image from the original appearance to a different appearance. Furthermore an effect can include modifications to the image such as adding in figures, colors, other images, and any general altering of the image.

In some implementations, mobile device 104 can be configured to perform a type of edit based on a type of movement of the mobile device. For example, the mobile device can be configured to detect translational movement (e.g., sliding) along an axis and/or rotational movement about an axis using motion sensors (e.g., an accelerometer) of mobile device 104. For example, a user can assign a particular type of edit to be applied to the image to a specific translational or rotational movement. For example, in FIG. 1, the movement of mobile device 104 is a rotational movement 102 about the Z-axis.

In some implementations, a type of edit can be assigned to movement 102. For example, the user can configure mobile device 104 to perform a particular type of edit when movement 102 is detected. For example, FIG. 1 shows a black and white filter assigned to movement 102 (e.g., rotation about the Z-axis). In some implementations, the degree to which the edit is applied to the image is controlled by the degree to which the mobile device is moved. For example, if the user rotates the device to the clockwise about the Z-axis, the black and white filter can adjust the image to display more white or lighten the image, resulting in image 108. If the user rotates the device counter-clockwise about the Z-axis, the filter can display more black or darken the image, resulting in image 110. This allows the user a simple and fun way to control the strength of the black and white filter. In certain implementations, any incremental rotational movement 102 will correspond to an incremental increase or decrease in filter strength. For example, every degree of rotation about the Z-axis can correspond to a change in a filter strength value. As the mobile device is rotated, the filter strength value can be incremented or decremented based on the amount or degrees of rotation about the Z-axis. For example, if the black and white filter has a corresponding range of adjustment or strength values from one to ten, then rotating the mobile device counter-clockwise one degree can cause the current filter strength value to decrement by one. Likewise, rotating the mobile device clockwise one degree can cause the current filter strength value to increment by one.

In some implementations, other filters or edit types can be assigned to rotational movement about the Z-axis. For example, a user can choose a filter that removes high frequency elements of an image. The degree of rotation 102 of the mobile device 104 can correspond to a movement of the stop band or pass band of the filter. Furthermore, any aspect of a filter can be increased or decreased depending on the movement of the mobile device.

In some implementations, an image effect can be manipulated based on rotation of mobile device 102. For example, a user can choose an image effect that would make the image look older. The degree of rotation 102 of the mobile device 104 can correspond to an altering of the degree of aging of the image. Furthermore, any aspect of an effect can be increased or decreased depending on the movement of the mobile device.

Figure 2:
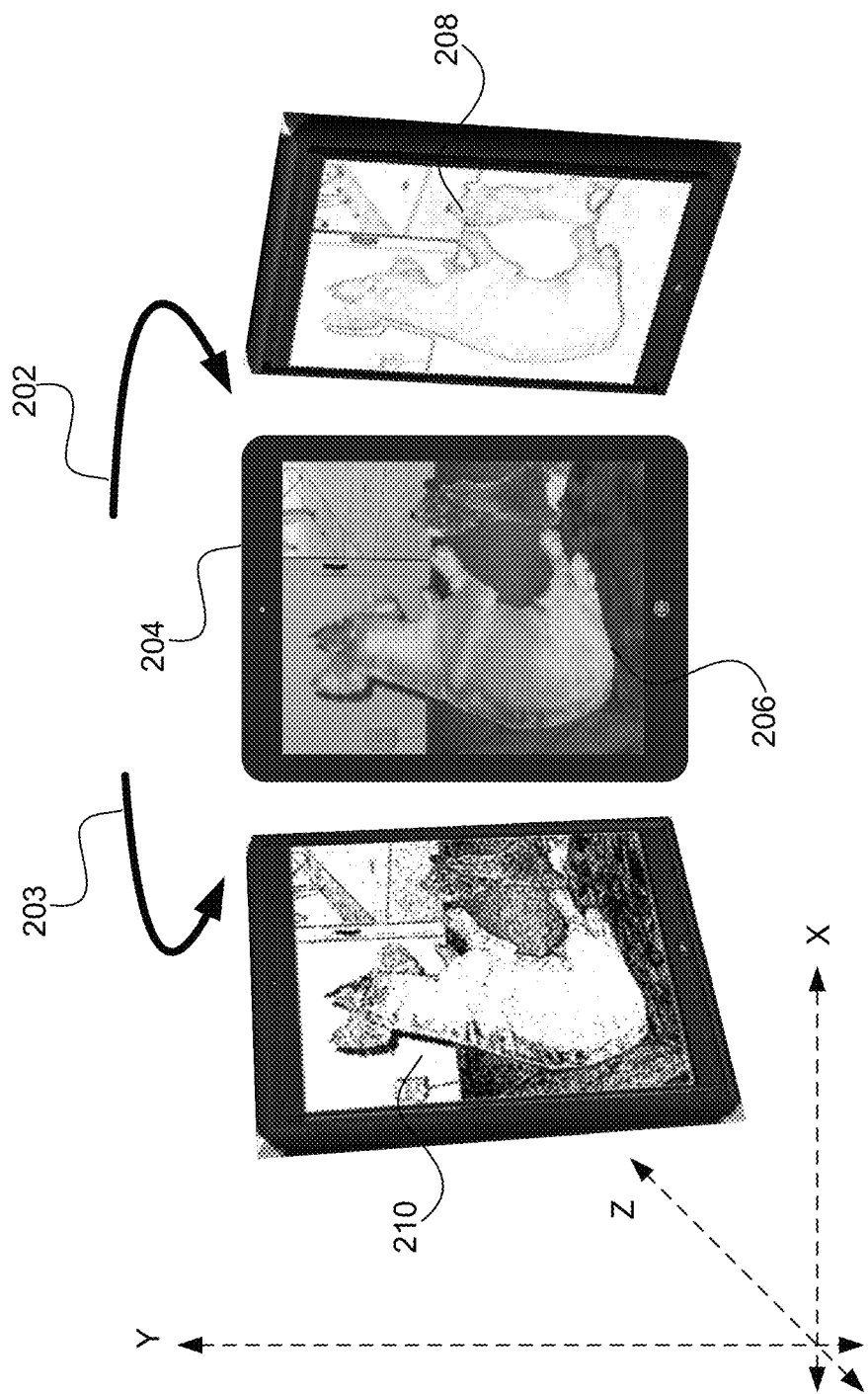
FIG. 2 illustrates an example of applying multiple types of edits to an image based on movement of a mobile device.

FIG. 2 illustrates an example of applying multiple types of edits to an image based on movement of a mobile device. In some implementations, multiple edits can be applied to image 206 based on the same rotational or translation movement of mobile device 204. For example, a rotation about the Y-axis can be selected by a user to cause to two different types of edits. If the mobile device moves in direction 202 (e.g., clockwise) about the Y-axis, a first edit can be applied resulting in image 208. If the mobile device moves in the opposite direction 203 (e.g., counter-clockwise) about the Y-axis, a second edit can be applied resulting in image 210.

In some implementations, multiple types of edits can be applied to the image based on the same rotational or translational direction of the mobile device. For example, a rotation about an axis in a single direction can be chosen by a user to correspond to two different edits. If the mobile device moves in one direction about the Y-axis, a first and second edit can be applied simultaneously. Other edits can be applied when the mobile device is rotated in the opposite direction about the Y-axis. In this way, any number of edits can be applied to the image simultaneously. In some implementations, multiple image filters and image effects can be chosen as the edits to be applied to the image. Any aspect of a filter or effect can be increased or decreased depending on the movement of the mobile device.

Figure 3:
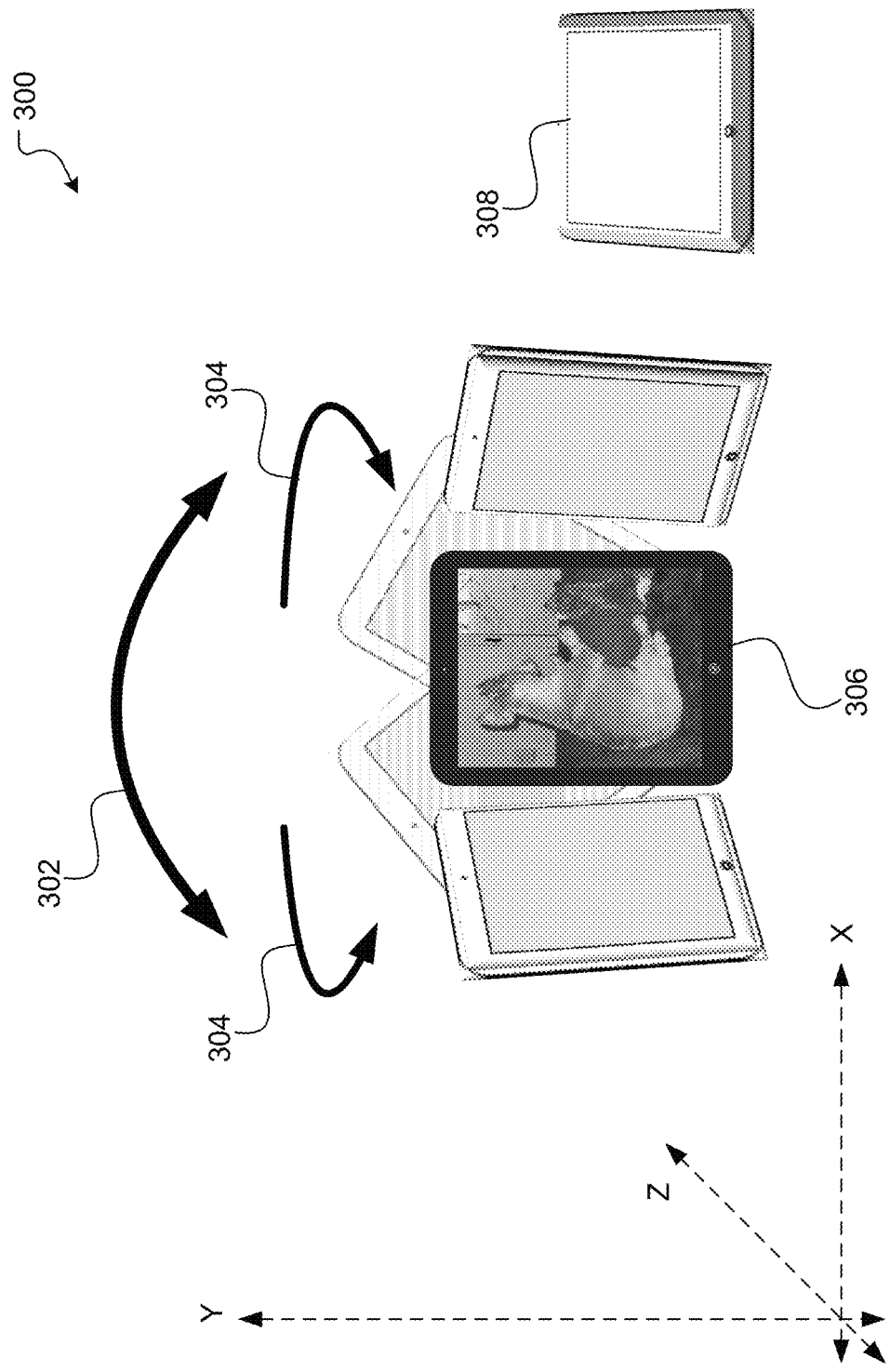
FIG. 3 illustrates an example of the types of rotational movements that can be used to edit an image.

FIG. 3 illustrates an example of the types of rotational movements 300 that can be used to edit an image. In some implementations the mobile device can include an accelerometer sensor and/or a gyroscope sensor to detect movement of the mobile device. In some implementations, the mobile device 306 can be rotated about the X-axis 308, about the Y-axis 304, and/or about the Z-axis 302. In some implementations, the mobile device can determine these rotations about a single axis or multiple axes at the same time, and determine the degree to which the device has been rotated. For example, a rotational movement can be performed in 360 degrees (e.g., a full circle). However, edits can be constrained to a 90 degree arc so that the user can view the display of the mobile device while editing the image. If contrast is being adjusted in the image, the maximum and minimum contrast values can be seen within a 90 degree arc (e.g., 45 degrees left rotation, 45 degrees right rotation), for example.

Figure 4:
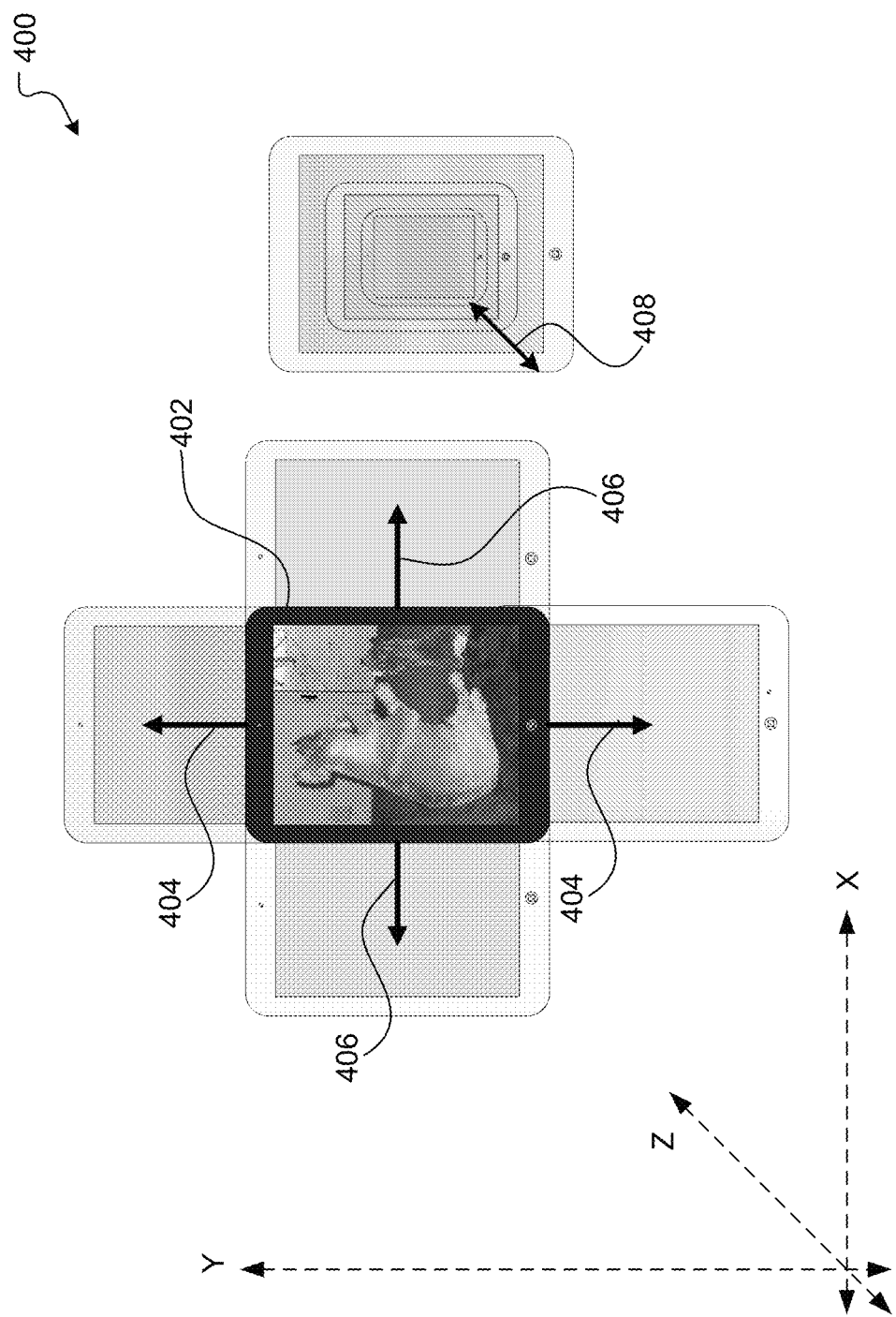
FIG. 4 illustrates an example the types of translational movements that the can be used to edit an image.

FIG. 4 illustrates an example the types of translational movements 400 that the can be used to edit an image. In some implementations, mobile device 402 can include an accelerometer sensor and/or a gyroscope sensor to detect movement of the mobile device. In some implementations, the mobile device can detect a translation (e.g., sliding) movement along the X-axis 406, along the Y-axis 404, and/or along the Z-direction 408. In some implementations, the mobile device can detect these translations along a single axis or multiple axes at the same time, and determine the degree to which the device has been translated. For example, the degree or amount of translation movement can be determined by duration (e.g., the amount of time that the mobile device is moved) or force (e.g., the magnitude of acceleration).

In some implementations, the mobile device can determine both rotation and translation at the same time. In some implementations, the mobile device can detect a movement that has been predefined or configured by the user or the image editing application. In some implementations, if the mobile device detects a predefined movement, a defined action (e.g., applying type of edit, filter, effect, etc.) can be taken by the image editing application.

In some implementations, a predefined movement can be a shake motion. For example, a shake can be detected when the mobile device is moved rapidly along or about an axis, or along or about multiple axes. For example, a shake motion can be detected when the motion sensor detects a rapid movement along the positive and negative X-direction. In some implementations, if the shake motion is detected by the mobile device, the image editing application can apply a specific edit to the image. In some implementations, the image editing interface can remove edits (e.g., undo) previously applied to the image when a shake motion is detected. In some implementations, the image editing interface can change the selected image to another image stored on the mobile device in response to detecting a shake motion.

In some implementations, a predefined movement can be a slap motion. For example, a slap motion can be detected when the mobile device is moved rapidly from a resting position, in a single direction around an axis of rotation (e.g., x, y or z axis). For example, a slap can be detected by the mobile device if the mobile device accelerates quickly from a motionless state and rapidly moves 45 degrees about the X-axis. In some implementations, if a slap motion is detected by the mobile device, the image editing interface can apply a specific edit to the image. In some implementations, the image editing interface can change the displayed image to another image stored on the mobile device. For example, the slap motion can cause the mobile device to display the next image in a list of images stored on the mobile device.

Figure 5:
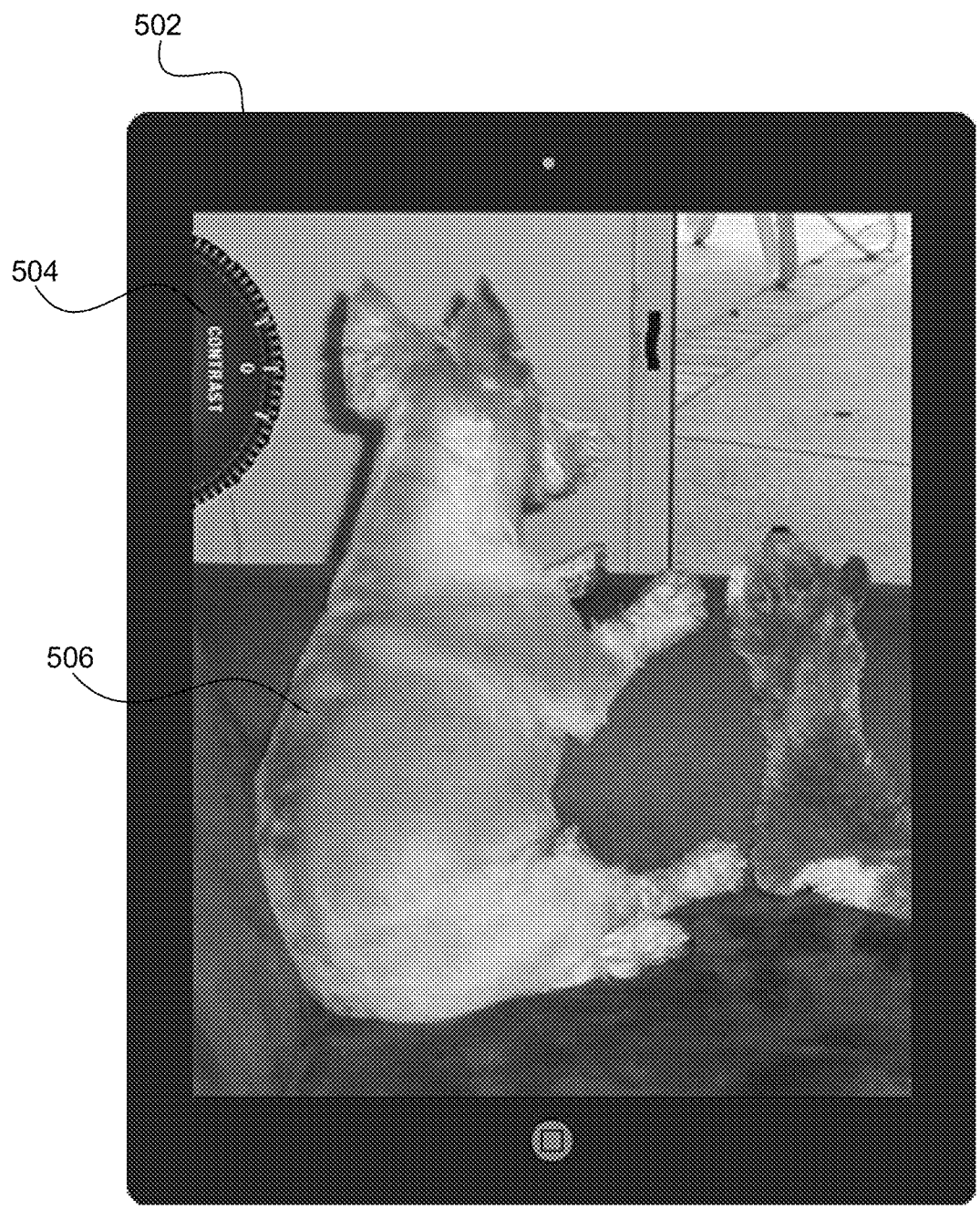
FIG. 5 illustrates an example graphical interface having graphical element indicating a current value for a type of edit.

FIG. 5 illustrates an example graphical interface having graphical element indicating a current value for a type of edit. For example, image 506 can be presented on a graphical interface of mobile device 502. The graphical interface can include graphical element 504 for indicating the current value (e.g., strength, degree) for an edit, filter, effect, etc. and indicates the type of edit chosen to be applied to the image. For example, graphical element 504 can be a heads up display (HUD) indicating the current value of an attribute of the image that is being edited or changed. For example, the type of edit and current value can be visually represented to the user as a dial overlaid on the image on the display of mobile device 502. The dial can be animated to rotate or change based on the movement of mobile device 502. For example, as mobile device 502 is rotated, the dial can rotate to indicate the current value for the selected edit. For example, the type of edit chosen to be applied to the image can be a contrast adjustment. The contrast of the image can be adjusted based on the detected rotation of mobile device 502 about the Z-axis, for example. The dial can show the name of the type of edit (e.g., contrast) next to a representation of the current contrast value as specified by the movement of the mobile device about the Z-axis.

In some implementations, a corresponding graphical element 504 can be displayed for each edit being applied to the image. For example, if contrast and sharpness attributes of an image are being adjusted, then multiple graphical elements 504 can be displayed for indicating contrast and sharpness values as the image is being edited.

In some implementations, only graphical elements 504 that correspond to a particular movement of the mobile device are displayed on the mobile device 502. For example, a first edit type can be assigned to a rotation about the Z-axis, and a second edit type can be assigned to a rotation about the Y-axis. If the mobile device is currently being rotated about the Z-axis, only the graphical element 504 corresponding to the first edit is shown on the mobile device.

Figure 6:
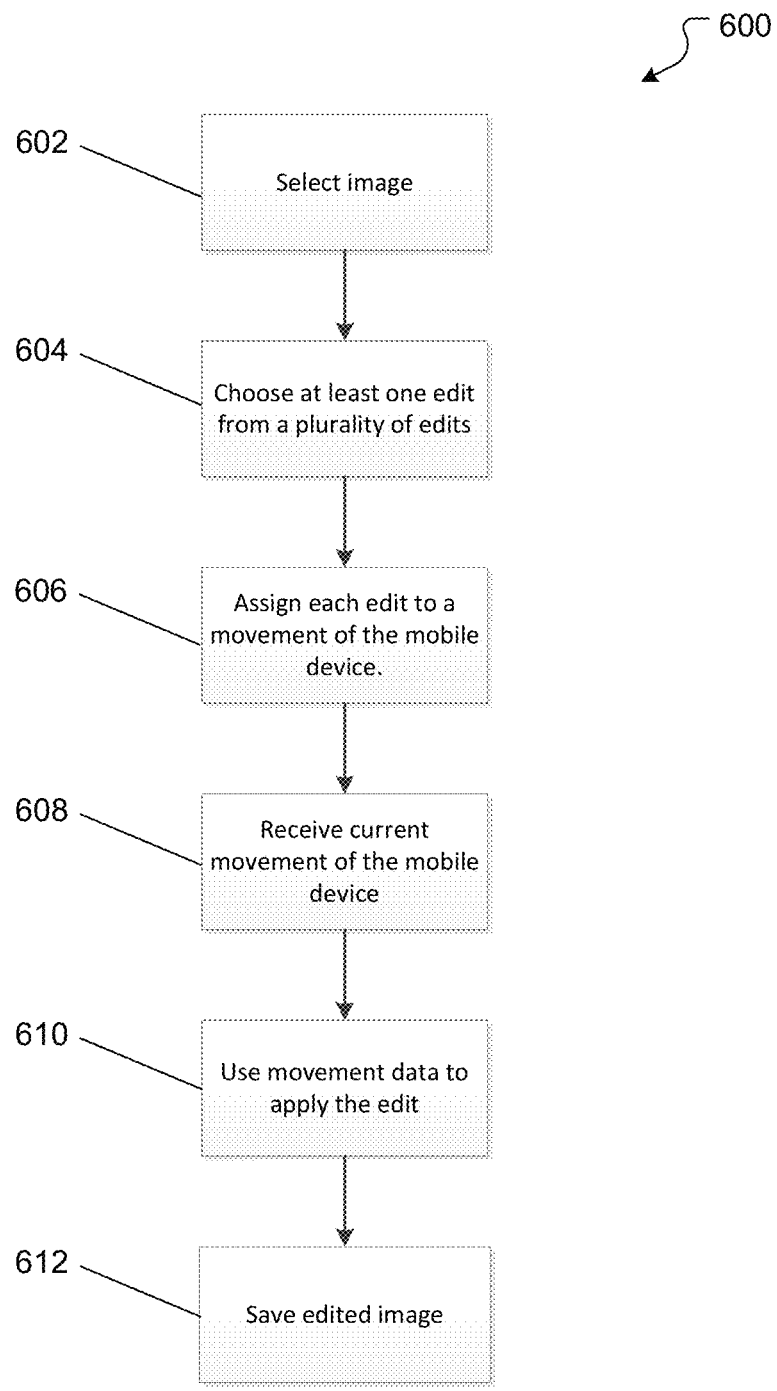
FIG. 6 is a flow diagram of an example process for editing an image based on the movement of a mobile device.

FIG. 6 is a flow diagram of an example process 600 for editing an image based on the movement of a mobile device. At step 602, an image can be selected by the user. For example, the user can select an image from an image library stored on the mobile device. At step 604, at least one edit type is selected by the user. For example, the user can select to adjust one or more attributes (e.g., contrast, brightness, saturation, etc.) of the image, the user can select a filter (e.g., gray scale, blur, sharpen, edge filter, embossing, etc.) to apply to the image or the user can select an effect (e.g., vintage look) to apply to the image. At step 606, a selected edit type can be assigned to a movement type. For example, the movement can include a predefined movement (e.g., pattern of motion, slap, shake, etc.), or a rotational or translational movement. For example, the use can assign a blur filter to rotation about the Z-axis and a contrast adjustment to rotation about the X-axis.

At step 608, the mobile device can detect movement of the mobile device. For example, the mobile device can detect movement of the mobile device using a built-in motion sensor (e.g., accelerometer). At step 610, the detected movement can be used to edit the image. For example, if the detected movement corresponds to movement about the Z-axis, then the image can be adjusted using the blur filter. If the detected movement corresponds to movement about the X-axis, then the contrast of the image can be adjusted. In some implementations, the degree to which the edit is applied to the image can correspond to the amount of movement detected. For example, rotational movements can be measured in degrees (e.g., up to 360 degrees rotation). Translational movements can be measured in time, force (e.g., amount of acceleration), or distance. The amount of image adjustment (e.g., the extent to which the blur filter is applied, the amount that the image contrast is adjusted) can correspond to the amount of rotational or translational movement detected by the mobile device. At step 612, the mobile device can receive input indicating that the image should be saved. For example, the mobile device can save the adjustments to the image and store the adjusted image on the mobile device.

Example System Architecture

Figure 7:
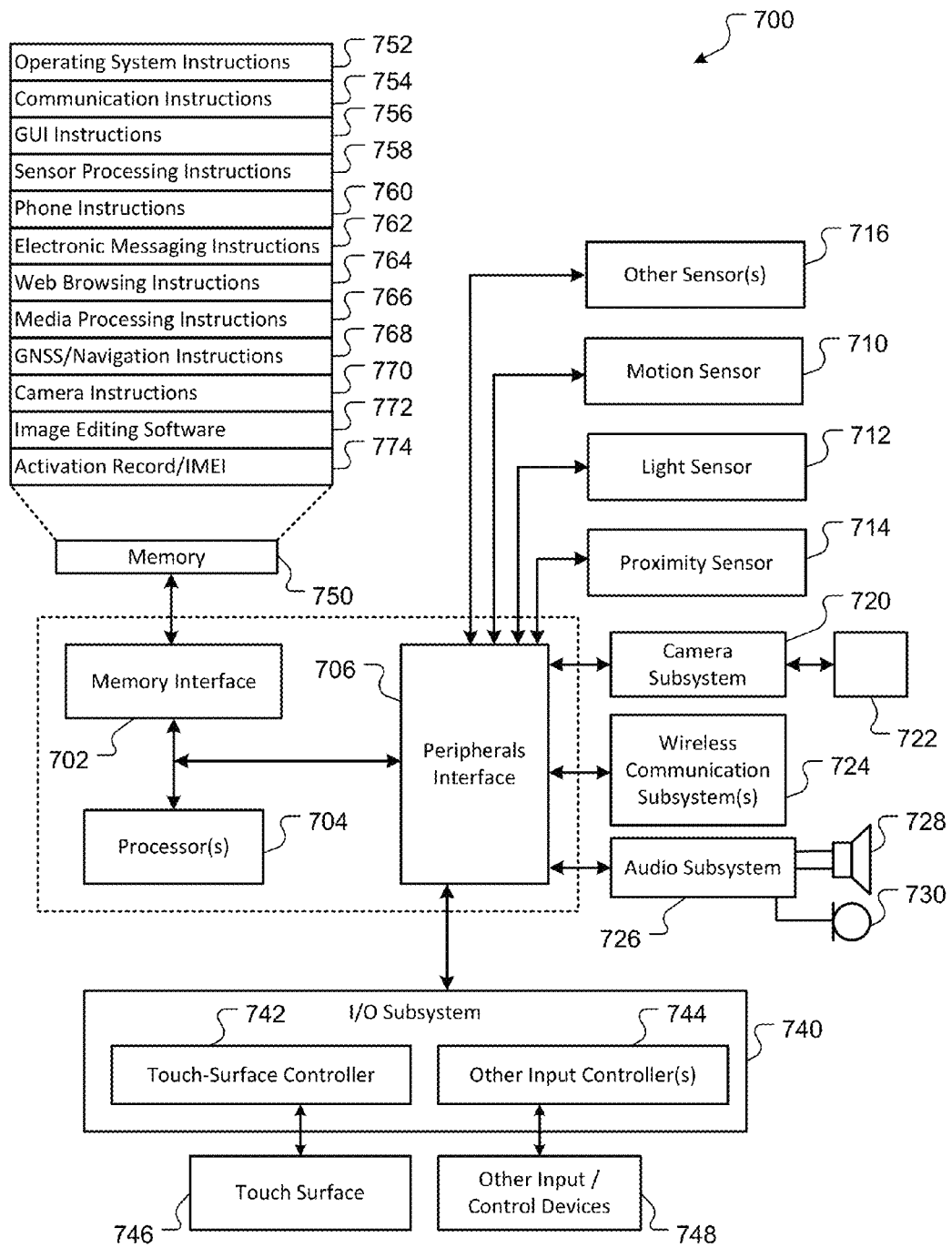
FIG. 7 is a block diagram of an example system architecture implementing the features and processes of FIGS. 1-6.

FIG. 7 is a block diagram of an example computing device 700 that can implement the features and processes of FIGS. 1-6. The computing device 700 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the computing device 700 can be coupled by one or more communication buses or signal lines.

Sensors, devices, and subsystems can be coupled to the peripherals interface 706 to facilitate multiple functionalities. For example, a motion sensor 710 which can include an accelerometer and a gyroscope, a light sensor 712, and a proximity sensor 714 can be coupled to the peripherals interface 706 to facilitate orientation, lighting, and proximity functions. Other sensors 716 can also be connected to the peripherals interface 706, such as a global navigation satellite system (GNSS) (e.g., GPS receiver), a temperature sensor, a biometric sensor, or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips. The camera subsystem 720 and the optical sensor 722 can be used to collect images of a user to be used during authentication of a user, e.g., by performing facial recognition analysis.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computing device 700 is intended to operate. For example, the computing device 700 can include communication subsystems 724 designed to operate over a GSM network, a GPRS network, an EDGE network, a Wi-Fi or WiMax network, and a Bluetooth™ network. In particular, the wireless communication subsystems 724 can include hosting protocols such that the device 100 can be configured as a base station for other wireless devices.

An audio subsystem 726 can be coupled to a speaker 728 and a microphone 730 to facilitate voice-enabled functions, such as speaker recognition, voice replication, digital recording, and telephony functions. The I/O subsystem 740 can include a touch-surface controller 742 and/or other input controller(s) 744. The touch-surface controller 742 can be coupled to a touch surface 746. The touch surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration can disengage a lock of the touch surface 746; and a pressing of the button for a second duration that is longer than the first duration can turn power to the computing device 700 on or off. Pressing the button for a third duration can activate a voice control, or voice command, module that enables the user to speak commands into the microphone 730 to cause the device to execute the spoken command. The user can customize a functionality of one or more of the buttons. The touch surface 746 can, for example, also be used to implement virtual or soft buttons and/or a keyboard.

In some implementations, the computing device 700 can present recorded audio and/or video files, such as MP3, AAC, and MPEG files. In some implementations, the computing device 700 can include the functionality of an MP3 player, such as an iPod™. The computing device 700 can, therefore, include a 36-pin connector that is compatible with the iPod. Other input/output and control devices can also be used.

The memory interface 702 can be coupled to memory 750. The memory 750 can include high-speed random access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks.

The operating system 752 can include instructions for handling basic system services and for performing hardware dependent tasks. In some implementations, the operating system 752 can be a kernel (e.g., UNIX kernel). In some implementations, the operating system 752 can include instructions for performing image editing based on movement of computing device 700. For example, operating system 752 can implement one or more of the motion detection and image editing features as described with reference to FIGS. 1-6.

The memory 750 can also store communication instructions 754 to facilitate communicating with one or more additional devices, one or more computers and/or one or more servers. The memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions.

The memory 750 can store other software instructions 772 to facilitate other processes and functions, such as the motion detection and image editing processes and functions as described with reference to FIGS. 1-6. The memory 750 can also store other software instructions (not shown), such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) 774 or similar hardware identifier can also be stored in memory 750.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

What is claimed is:

1. A method comprising:
   presenting content of an image file in an image editing interface of a mobile device, wherein the image editing interface includes a plurality of edits that can be applied to the content of the image file;
   obtaining sensor data measuring movement of the mobile device; and
   applying an edit of the plurality of edits to the content of the image file based on the movement measured at the mobile device, comprising:
   determining a linear or angular direction of the movement of the mobile device from the sensor data;
   selecting the edit from the plurality of edits according to the linear or angular direction of the movement;
   increasing or decreasing an aspect of a filter or effect associated with the edit according to an amount of the movement of the mobile device, wherein the amount of the movement controls a degree to which the edit is applied to the image, a higher amount of movement causing a higher amount of change in the content of the image file and a higher amount of visual difference between changed content of the image file and content of the image file before the change; and
   applying the aspect of the filter or effect associated with the edit to the content of the image file.

2. The method of claim 1, wherein:
   determining the linear or angular direction of the movement comprises determining from the sensor data that the movement of the mobile device includes a rotation about an axis; and selecting the edit comprises selecting a first edit when the rotation about the axis is to a first direction or selecting a second edit when the rotation about the axis is to a second direction.

3. The method of claim 1, wherein:
determining the linear or angular direction of the movement comprises determining from the sensor data that the movement of the mobile device includes a translation along an axis; and
selecting the edit comprises selecting a first edit when the translation along the axis slides to a first direction or selecting a second edit when the translation along the axis slides to a second direction.

4. The method of claim 1, comprising:
detecting that the mobile device simultaneously moves along a first axis and along a second axis; and
selecting a first edit upon detecting that the mobile device moves along the first axis and selecting a second edit upon detecting that the mobile device moves along the axis, wherein selecting the first edit and selecting the second edit appear simultaneous to a user of the mobile device.

5. The method of claim 1, wherein:
determining the linear or angular direction of the movement comprises determining from the sensor data that the movement of the mobile device includes a pattern of movement; and
selecting the edit comprises selecting a first edit when the movement includes a first pattern or selecting a second edit when the movement includes a second pattern.

6. The method of claim 5, wherein the pattern of movement is a shake or a slap, and the aspect includes at least one of a contrast, brightness, saturation, hue or chroma.

7. The method of claim 5, wherein determining that the movement includes the pattern comprises determining an amount of acceleration of the mobile device around an axis.

8. A non-transitory computer-readable medium including one or more sequences of instructions which, when executed by one or more processors, cause the one or more processors to perform operations comprising:
presenting content of an image file in an image editing interface of a mobile device, wherein the image editing interface includes a plurality of edits that can be applied to the content of the image file;
obtaining sensor data measuring movement of the mobile device; and
applying an edit of the plurality of edits to the content of the image file based on the movement measured at the mobile device, comprising:
determining a linear or angular direction of the movement of the mobile device from the sensor data;
selecting the edit from the plurality of edits according to the linear or angular direction of the movement;
increasing or decreasing an aspect of a filter or effect associated with the edit according to an amount of the movement of the mobile device, wherein the amount of the movement controls a degree to which the edit is applied to the image, a higher amount of movement causing a higher amount of change in the content of the image file and a higher amount of visual difference between changed content of the image file and content of the image file before the change; and
applying the aspect of the filter or effect associated with the edit to content of the image file.

9. The non-transitory computer-readable medium of claim 8, wherein:
determining the linear or angular direction of the movement comprises determining from the sensor data that the movement of the mobile device includes a rotation about an axis; and
selecting the edit comprises selecting a first edit when the rotation about the axis is to a first direction or selecting a second edit when the rotation about the axis is to a second direction.

10. The non-transitory computer-readable medium of claim 8, wherein:
determining the linear or angular direction of the movement comprises determining from the sensor data that the movement of the mobile device includes a translation along an axis; and
selecting the edit comprises selecting a first edit when the translation along the axis slides to a first direction or selecting a second edit when the translation along the axis slides to a second direction.

11. The non-transitory computer-readable medium of claim 8, the operations comprising:
detecting that the mobile device simultaneously moves along a first axis and along a second axis; and
selecting a first edit upon detecting that the mobile device moves along the first axis and selecting a second edit upon detecting that the mobile device moves along the axis, wherein selecting the first edit and selecting the second edit appear simultaneous to a user of the mobile device.

12. The non-transitory computer-readable medium of claim 8, wherein:
determining the linear or angular direction of the movement comprises determining from the sensor data that the movement of the mobile device includes a pattern of movement; and
selecting the edit comprises selecting a first edit when the movement includes a first pattern or selecting a second edit when the movement includes a second pattern.

13. The non-transitory computer-readable medium of claim 12, wherein the pattern of movement is a shake or a slap.

14. The non-transitory computer-readable medium of claim 12, wherein determining that the movement includes the pattern comprises determining an amount of acceleration of the mobile device around an axis.

15. A system comprising:
one or more processors; and
a computer-readable medium including one or more sequences of instructions which, when executed by the one or more processors, cause the one or more processors to perform operations comprising:
presenting content of an image file in an image editing interface of a mobile device, wherein the image editing interface includes a plurality of edits that can be applied to the content of the image file;
obtaining sensor data measuring movement of the mobile device;
applying an edit of the plurality of edits to the content of the image file based on the movement measured at the mobile device, comprising:
determining a linear or angular direction of the movement of the mobile device from the sensor data;
selecting the edit from the plurality of edits according to the linear or angular direction of the movement;
increasing or decreasing an aspect of a filter or effect associated with the edit according to an amount of the movement of the mobile device, wherein the amount of the movement controls a degree to which the edit is applied to the image, a higher amount of movement causing a higher amount of change in the content of the image file and a higher amount of visual difference between changed content of the image file and content of the image file before the change; and applying the aspect of the filter or effect associated with the edit to content of the image file;

receiving user input; and in response to receiving the user input, storing the image on a storage device.

16. The system of claim 15, wherein:
determining the linear or angular direction of the movement comprises determining from the sensor data that the movement of the mobile device includes a rotation about an axis; and selecting the edit comprises selecting a first edit when the rotation about the axis is to a first direction or selecting a second edit when the rotation about the axis is to a second direction.

17. The system of claim 15, wherein:
determining the linear or angular direction of the movement comprises determining from the sensor data that the movement of the mobile device includes a translation along an axis; and selecting the edit comprises selecting a first edit when the translation along the axis slides to a first direction or selecting a second edit when the translation along the axis slides to a second direction.

18. The system of claim 15, the operations comprising:
detecting that the mobile device simultaneously moves along a first axis and along a second axis; and selecting a first edit upon detecting that the mobile device moves along the first axis and selecting a second edit upon detecting that the mobile device moves along the axis, wherein selecting the first edit and selecting the second edit appear simultaneous to a user of the mobile device.

19. The system of claim 15, wherein:
determining the linear or angular direction of the movement comprises determining from the sensor data that the movement of the mobile device includes a pattern of movement; and selecting the edit comprises selecting a first edit when the movement includes a first pattern or selecting a second edit when the movement includes a second pattern.

20. The system of claim 19, wherein the pattern of movement is a shake or a slap.

21. The system of claim 19, the operations comprising:
detecting that the mobile device simultaneously moves along a first axis and along a second axis; and selecting a first edit upon detecting that the mobile device moves along the first axis and selecting a second edit upon detecting that the mobile device moves along the axis, wherein selecting the first edit and selecting the second edit appear simultaneous to a user of the mobile device.

* * * * *